United States Patent [19]

Ohki et al.

[11] 4,440,701
[45] Apr. 3, 1984

[54] METHOD FOR FORMING VISCOUS AND PLASTICALLY DEFORMABLE FOOD MATERIAL INTO A GLOBULIN SHAPE

[75] Inventors: Katsumoto Ohki, Shizuoka; Tadahiko Hirokawa, Yokohama; Hajime Sasaki, both of Kanagawa, all of Japan

[73] Assignee: Morinaga & Co., Ltd., Japan

[21] Appl. No.: 248,574

[22] Filed: Mar. 27, 1981

[30] Foreign Application Priority Data

Apr. 5, 1980 [JP] Japan .................................. 55-44064
Jul. 21, 1980 [JP] Japan .................................. 55-98811

[51] Int. Cl.³ .............................................. B01J 21/04
[52] U.S. Cl. ....................................... 264/15; 264/310; 264/313; 264/314; 264/320
[58] Field of Search ............... 264/310, 313, 314, 320, 264/15; 425/90, 96, 99, 107, 112, 332, 333, 335, 425/389, 409

[56] References Cited

U.S. PATENT DOCUMENTS 2,553,759  5/1951  Geiger ................................. 264/15
4,341,663  7/1982  Derleth ............................... 264/15

Primary Examiner—John A. Parrish
Attorney, Agent, or Firm—McGlew and Tuttle

[57] ABSTRACT

A method and an apparatus is disclosed for forming viscous and resilient food material into a globular or spherical shape by feeding such food material, in a predetermined amount, between a pair of beds. The surfaces of the beds face each other and are kept wet by capillary action, with an anti-sticking liquid. The surfaces are adjustably spaced, one from the other, so as to apply an optimal level of pressure on the food material. At least one of the beds are subjected to an eccentric rotation to produce globe-shaped viscous and resilient food material at small cost and on a large scale by making it possible to mechanically form the viscous and plastic food material into a globular or spherical shape.

14 Claims, 4 Drawing Figures

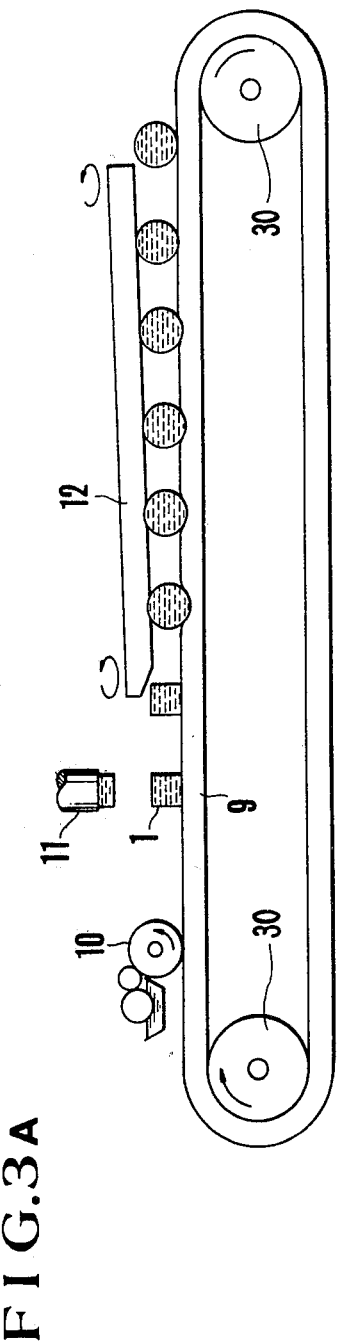
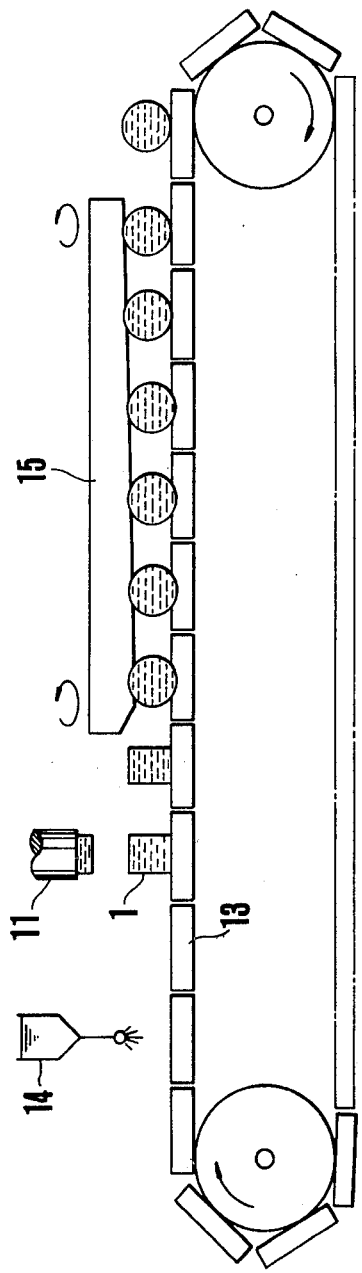
FIG.3A
FIG.3B

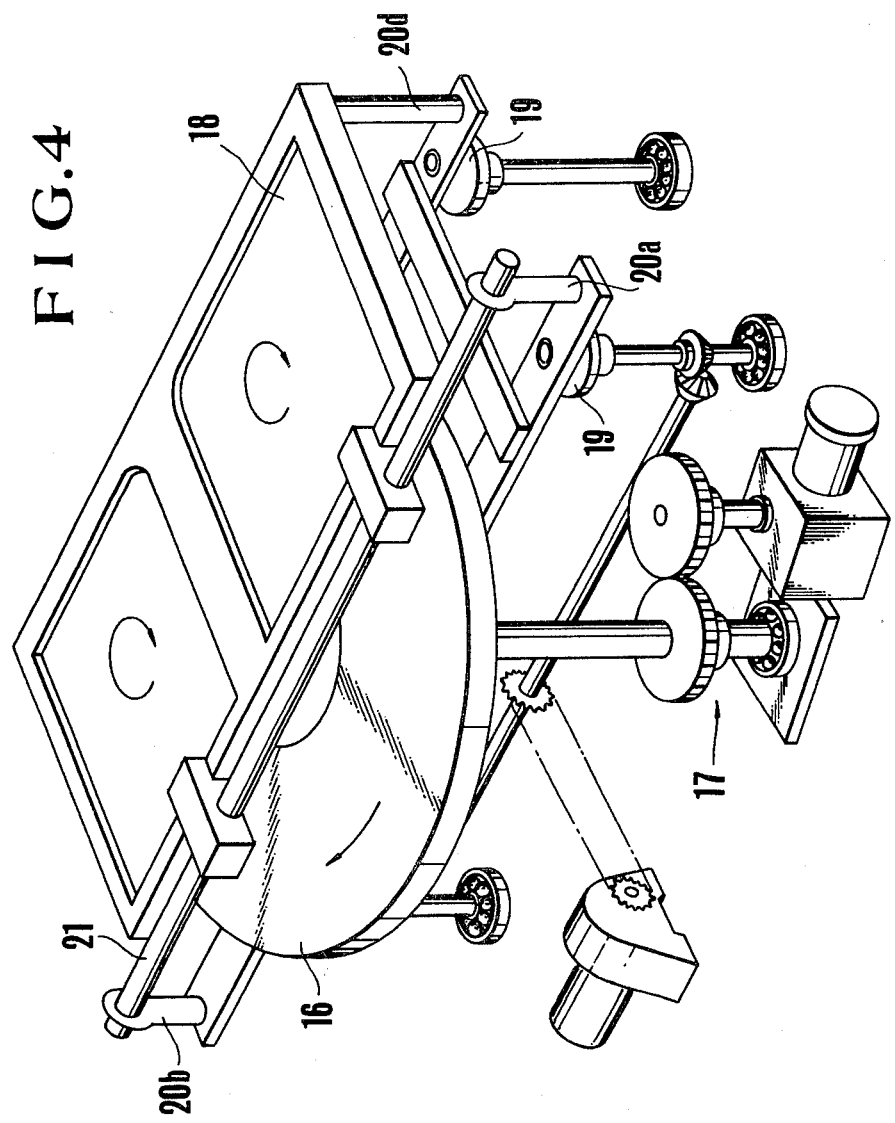

METHOD FOR FORMING VISCOUS AND PLASTICALLY DEFORMABLE FOOD MATERIAL INTO A GLOBULIN SHAPE

BACKGROUND OF THE INVENTION

The present invention relates in general to food processing, and in particular to a new and useful method of forming viscous, sticky and plastically deformable food material into globular or spherical shapes.

Conventional apparatus for forming viscous and plastically deformable food material into a globular shape such as pan rounders, inverted cone rounders, and seamless cutters, have had difficulty in forming markedly sticky, plastically deformable food materials into a globular shape. For this reason, so-called "no stick" surfaces have been utilized to manufacture such apparatus, for example polytetrafluoroethylene (Teflon), in an attempt to avoid the adhesion of sticky and plastic food materials to the apparatus.

These attempts, however, have resulted in higher costs for manufacture of such apparatus and, moreover, adhesion to the apparatus has not been prevented for food materials which are more viscous than plastic. Specifically, it has been impossible to turn portions of plastic food materials such as truffle paste, comprising hydrophilic and oleophilic materials blended with each other, into spheres or globules. Such food possesses markedly viscous properties and, therefore, manual work has been required for globe formation, resulting in low productivity and high costs of making these shaped food products.

SUMMARY OF THE INVENTION

The inventors of the present invention, with a view toward mechanically forming viscous and plastic food material into spheres or globules, at lower cost on a larger scale, made close observations of human hands as they shaped a viscous and plastic food material into a globe. They found that a viscous and plastic food material can be rounded by rotating it between a pair of beds, each with a surface similar in nature to the human hand, while applying a proper level of pressure to the food material. More specifically, it was learned that the inner surfaces of the human hands possess a degree of elasticity suitable for rounding viscous and plastic food material therebetween and that the hands were kept moist with the liquid contained in, and transmitted from, the food material being rounded so that even resilient food materials of eminent viscosity hardly stick to the inner surfaces of the hands.

It was further noted that the right and left hands, when rounding the viscous and plastic food material, were so disposed and formed as to make a nearly spherical hollow. Rotation of the food material within this hollow and without slippage was achieved due the lines on the inner surface of the hands while accommodation of the pressure to the food material to a proper level was obtained by continuously adjusting the distance between the two hands. While too large a pressure on the viscous and plastic food material resulted in its adhesion to the hands, too small a pressure did not cause it to rotate in the hands, thus failing to round the material. The pressure applied to the viscous and plastic food material, therefore, needs to be larger in the beginning and gradually reduced, as the food material, in degrees, assumes a globular shape, and until the food material is almost relieved of the pressure at the end of the operation.

BRIEF DESCRIPTION OF THE DRAWINGS

FIG. 2A shows a bed wherein a porous elastic material is used while FIG. 2B shows a bed wherein a fluid-filled elastic bag is used.

FIG. 3A shows an apparatus for successively turning viscous and plastic food material portions in globes, wherein a food material conveying bed is in the form of an endless belt. FIG. 3B shows an apparatus for the same purpose wherein a food material conveying bed is made of a plurality of beds juxtapositionally arranged on an endless chain.

FIG. 4 illustrates an apparatus for successively globing viscous and plastic food material portions, wherein a food material conveying bed is made in a disklike form.

DETAILED DESCRIPTION OF THE PREFERRED EMBODIMENTS

Figures 1A, 1B, 1C:
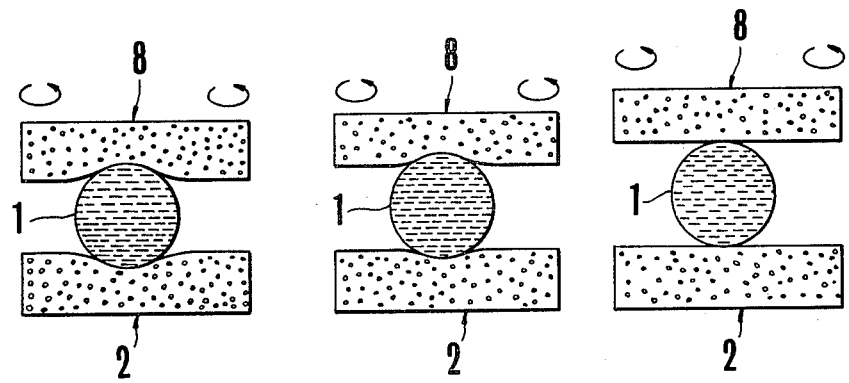
FIGS. 1A, 1B and 1C respectively show, in cross section, a pair of beds with a viscous and plastic food material portion therebetween, illustrating the globe forming operation progressing in that order, according to the invention.

Referring to FIGS. 1A, 1B and 1C, a viscous and plastically deformable food material portion 1, is placed between a pair of beds 2 and 8, made of elastic material, of which the inner surfaces, disposed opposite to one another, are coated with a fibrous material such as cloth and kept moist with an antisticking liquid. This inventive arrangement mimics the manual operation wherein a spherical hollow is made by human hands. Note that the inner surfaces of the beds are recessed where they are in contact with food material portion 1 as shown in FIG. 1A. Upon eccentrically rotating one of the beds 8 (the eccentrical rotation being hereinafter described), food material portion 1 is allowed to rotate by its moderate friction with the inner surfaces of the beds which are covered with a fibrous material, and formed into a globe. It is noted with interest that an excellent globe is formed of food material portion 1 when a smaller space is initially provided between the beds (see FIG. 1A) so as to apply larger pressure on food material portion 1 in the early stage of the globe forming operation, and the spacing is gradually enlarged (see FIG. 1B) to reduce the pressure until food material portion 1 is almost relieved of pressure at the end of the operation (see FIG. 1C).

It is thus possible to shape a viscous and plastic food material into a globe by feeding a viscous and plastic food material portion, in a predetermined amount, into the space between a pair of beds of which the inner surfaces, facing opposite one another, are of an elastic nature and kept moist by capillary action with an antisticking liquid, and rotating the food material portion with at least one of the beds in an eccentrically rotational movement while accommodating the pressure on the food material portion by adjusting the distance between the beds.

Figure 2A:
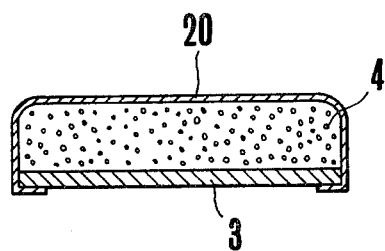
FIGS. 2A and 2B each show, in cross section, an embodiment of the bed used in the invention.
Figure 2B:
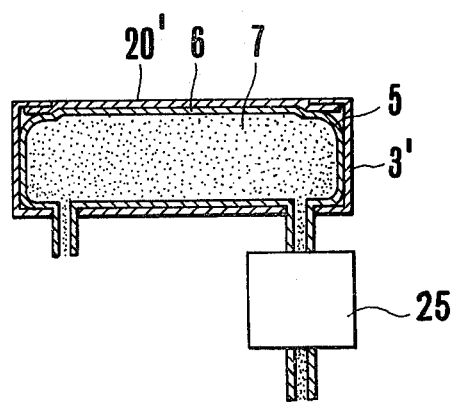

Referring to FIGS. 2A and 2B, the bed to be used in the present invention comprises an elastic body fixed on a support member and, 3 with its free surface formed substantially flat. An elastic body may be made of a porous elastic material 4 such as sponge or a fluid-filled elastic bag 5 such as an air bag, a liquid bag, etc. A fluid-filled elastic bag herein is a bag with at least a portion of its surface forming a seat 6 made of elastic material such as rubber and filled with a fluid 7 such as air, water, etc. so that its free surface may possess an elastic property. Using a fluid-filled elastic bag as such, it is possible to maintain the bed at a desired temperature by circulating fluid 7 filled in the bag through thermoregulating means 25. In general, the surface of the bed is by preference similar in its degree of elasticity to the inner surface of the human hand but the resiliency of the viscous and plastic food material to be globed should also be taken into account in a selection of the degree of elasticity of the bed surface. In cases where fluid-filled elastic bag 5 is used in the bed, it is also possible to provide the bed with a degree of elasticity most fit to the viscous and plastic food material to be globed by adjusting the amount of the fluid filled in the bag.

The surface of the bed according to the invention is kept moist with an anti-sticking liquid, by providing such liquid little by little, by capillary action onto, for example, a fibrous coating material 20, such as cloth, covering the bed. The anti-sticking liquid is desirably supplied to the surface of both of the pair of beds but may be supplied to the surface of only one of the beds as the viscous and plastic food material portion, as it is rotated between the beds, carries the liquid from the moistened bed surface onto the surface of the other bed. The anti-sticking liquid may be manually applied to the surface of the bed using either a brush or a spray gun but preferably is mechanically applied by automatic liquid applying means of brush type or roll type or alternatively, automatic spraying means, etc. Alternatively, in cases where the elastic body of the bed is made of a porous elastic material, the surface of the bed may be moistened with an anti-sticking liquid by allowing the liquid to be absorbed in advance in the porous elastic material (4 in FIG. 2A) and subsequently to penetrate the bed coating material (20).

When it is desirable, for hygienic reasons or for easy cleaning of the beds, to keep the food material free from direct contact with the elastic body, it is preferable to coat the elastic body with a film which is impervious to the anti-sticking liquid used and further cover the film with a fibrous material and the like (as with 20 in FIG. 2B). An anti-sticking liquid herein means a liquid which, while keeping the surface of the bed moist, serves to prevent the viscous and plastic food material from sticking to the surface of the bed and may be chosen from among liquids such as fatty oils, alcohol, glycerine, propylene glycol, silicon, water, solutions such as sugar solution, emulsifier solutions, etc., depending on the properties of the viscous and plastic food materials to be turned into spheres. Viscous and plastic or plastically deformable food material herein means a food material having plasticity and viscous enough to maintain the globular shape into which it is formed, such like processed rice pasty food material as mochi; dough made from powdered grain, such as dough of bread; plastic food material, such as a-n, containing starch as its principal ingredient; food material such as truffel paste, gianduya mass, marzipan mass, chocolate paste, containing fats and fatty oils mixed with sweetener such as sugar or corn syrup, etc.; or food material such as umpei, gyuhi, nerikiri, containing sugar or corn syrup.

With reference to FIGS. 1A, 1B and 1C the invention is practiced as follows: Viscous and plastic or deformable food material portion 1 is first placed on a fixedly provided elastic body bed 2.

The operation of dividing a food material into portions of a predetermined amount may be performed manually or by conventional, automatic devices used for such purpose.

An elastic body bed 8 is then placed over food material portion 1 previously deposed on elastic body bed 2. The upper bed 8 is then eccentrically rotated as hereinafter described in a plane parallel to fixed bed 2 with the space between the beds so provided as to apply a proper level of pressure to viscous and plastic food material portion 1. The space between the beds may be fixed throughout the globing operation but may first be relatively small so as to exert relatively large pressure on food material portion 1 and gradually be rendered large enough so that, in the end, the food material portion is almost relieved of pressure. This sequence is shown in FIGS. 1A, 1B and 1C respectively and a beautiful globed food material is thus obtained.

When food material portions of a predetermined amount are to be successively turned into spheres, to the fixed bed preferably becomes the bed of a conveyor moving in a given direction and formed, for example, of a plurality of beds which are juxtapositionally arranged on an endless chain or alternatively, the bed is in the form of an endless belt with the eccentrically rotating bed disposed parallel thereto. FIGS. 3A and 3B illustrate examples of apparatus for successively forming viscous and plastic food material portions into globes. FIG. 3A shows an apparatus consisting essentially of a food material conveying bed 9 of an endless belt type driven in a given direction by rollers 30 means 10 for applying an anti-sticking liquid; feeder 11 for feeding a predetermined amount of food material portions and; a bed 12 eccentrically rotating in a plane nearly parallel to the food material conveying bed 9. FIG. 3B shows an apparatus consisting essentially of a food material conveying bed 13 formed of a plurality of beds juxtapositionally arranged on an endless chain and driven in a given direction; a spray gun 14 for spraying an anti-sticking liquid onto the surface of bed 13; feeder 11 for feeding a predetermined amount of food material portions; and a bed 15 eccentrically rotated in a plane nearly parallel to food material conveying bed 13. The food material conveying bed and the eccentrically rotating bed are preferably disposed in somewhat inclined relation one to the other, so as to allow increasingly larger space for food material portions 1 as they are conveyed farther, so that the pressure exerted on them may be gradually reduced.

The floor area covered by those apparatus can be minimized by installing the apparatus longitudinally vertically or by forming the food material conveying bed into a disk form. An apparatus as shown in FIG. 4, for example, can be installed even in a narrow place and yet enables the successive globing operation to be performed. More specifically, the apparatus as shown in FIG. 4 comprises a turning bed 16 in the form of disk turned by a rotating means 17 in one direction and a bed 18 eccentrically rotated via disk cranks 19 and disposed almost parallel to, and over, turning bed 16 with part of the surface of turning bed 16 left uncovered by bed 18, the space between both the beds being adjustable by space adjusting means 20a to 20d (20c not shown) which may be screws. The surface of each of bed 16 and bed 18, opposite to each other, is made of an elastic body coated with a fibrous material. The eccentric rotation herein means a movement as exemplified by bed 18.

Viscous and plastic food material portions can be formed into globules by using the apparatus shown in FIG. 4 in the following manner:

Bed 16 is turned and bed 18 is eccentrically rotated whereon an anti-sticking liquid is supplied onto the surface of turning bed 16 from above the said uncovered part thereof to moisten the surface of bed 16.

Food material portions each in a predetermined amount are then fed onto bed 16. The amount of each food material portion to be fed is determined depending on the desired size of the globe into which it is to be formed. Food material portions are desirably fed at regular intervals and therefore automatic feeding with a device such as a depositor is preferred to manual feeding of food material portioned beforehand.

A food material portion deposited on the surface of turning bed 16 is conveyed by that bed to and through the space between turning bed 16 and eccentrically rotating bed 18 to be finally formed into a globe.

The space between both the beds may be fixed throughout the operation but a food material portion can be formed into a beautiful globular shape by adjusting the space with space adjusting means 20a to 20d in such a manner that the space is provided relatively narrow in the beginning of the operation and gradually widened untill it is in the end about as large as the diameter of the globe into which the food material portion is formed so that the food material portion may be rotated and rounded under a pressure which is first relatively large and gradually reduced untill the food material portion in the end hardly receives pressure from the beds at all.

The globed food material portions on turning bed 16 are preferably discharged automatically say, by providing a guide and the like where the globed food material portions come out of turning bed 16.

Eccentrically rotating bed 18, for easy cleaning and adjustment thereof, may be provided so as to be capable of pivoting on a shaft 21 as shown in FIG. 4 so that it can stand upright or be turned over.

While specific embodiments of the invention have been shown and described in detail to illustrate the application of the principles of the invention, it will be understood that the invention may be embodied otherwise without departing from such principles.

We claim:

1. A method of forming a viscous and plastic food material into a globular shape, comprising:
   feeding a viscous and plastic food material portion of a predetermined amount into the space between a pair of beds of which the surfaces, opposite to each other, have elasticity and a fibrous coating with at least one of the surfaces kept moist by an anti-sticking liquid; eccentrically rotating at least one of said beds, thus rotating and rounding the food material portion between the beds; and adjusting the space between the pair of beds to accommodate the pressure applied to the food material portion; the viscous and plastic food material being selected from the group consisting of processed rice paste food material, dough made from powdered grain, food material containing starch as its principal ingredient, food material containing fats and fatty oils mixed with a sweetener, and food material containing sugar or corn syrup.

2. The method of claim 1, wherein the viscous and plastic food material comprises food material containing fats and fatty oils mixed with a sweetener.

3. The method of claim 1, wherein the space between the beds is adjusted such that the space is first relatively narrow so that a relatively large pressure is applied to the viscous and plastic food material portion and gradually widened as the food material portion assumes a more and more globular form, until the pressure is lightly applied to the food material portion.

4. The method of claim 1, wherein each of the beds essentially consists of a porous elastic material or a fluid-filled bag.

5. The method of claim 4, wherein the porous elastic material is sponge.

6. The method of claim 4, wherein the fluid-filled bag is an air bag or a liquid bag.

7. The method of claim 6, wherein the fluid filled in the bag is allowed to circulate through thermo-regulating means.

8. The method of claim 1, wherein the elastic body of the beds is covered with a film impervious to the anti-sticking liquid used while the film is in its turn coated with a fibrous material.

9. The method of claim 1, wherein the surface of the beds is kept moist by one of; brushing, rolling, and spraying, an anti-sticking liquid onto the surface.

10. The method of claim 1, wherein the anti-sticking liquid is a liquid or liquids selected from the group consisting of fatty oils, alcohol, glycerine, propylene glycol, silicon, water, sugar solution and emulsifier solutions.

11. The method of claim 1, wherein the pair of beds are an eccentrically rotating bed and a food material conveying bed moving in a given direction.

12. The method of claim 11, wherein the food material conveying bed is a plurality of beds juxtapositionally arranged on an endless chain.

13. The method of claim 11, wherein the food material conveying bed is in the form of an endless belt.

14. The method of claim 11, wherein the food material conveying bed is of a disklike form.

* * * * *

UNITED STATES PATENT OFFICE
CERTIFICATE OF CORRECTION

Patent No. 4,440,701                    Dated April 3, 1984

Inventor(s) Katsumoto Ohki, Tadahiko Hirokawa & Hajime Sasaki

It is certified that error appears in the above-identified patent and that said Letters Patent are hereby corrected as shown below:

On the cover page of the Patent in the title change "GLOBULIN" to -- GLOBULAR --;

In the Abstract lines 2 and 10, change "resilient" to -- plastic --;

In Column 1, in the title, change "GLOBULIN" to --GLOBULAR--;

In column 1, line 50, change "resilient" to -- plastic --;

In column 2, line 66, change "and, 3" to -- 3 and 3' --;

In column 4, line 33, before "means" insert a semicolon.

In column 4, line 36, change "and; a" to --; and a--

Signed and Sealed this

Twenty-ninth Day of January 1985

[SEAL]

Attest:

DONALD J. QUIGG

Attesting Officer        Acting Commissioner of Patents and Trademarks